(12) United States Patent
Smith et al.

(10) Patent No.: US 10,574,636 B2
(45) Date of Patent: *Feb. 25, 2020

(54) SYSTEM, APPARATUS AND METHOD FOR MIGRATING A DEVICE HAVING A PLATFORM GROUP

(71) Applicant: McAfee, LLC, Santa Clara, CA (US)

(72) Inventors: Ned M. Smith, Beaverton, OR (US); Sven Schrecker, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,061

(22) Filed: Feb. 5, 2018

(65) Prior Publication Data
US 2018/0176196 A1 Jun. 21, 2018

Related U.S. Application Data

(63) Continuation of application No. 14/976,165, filed on Dec. 21, 2015, now Pat. No. 9,923,881.

(60) Provisional application No. 62/241,277, filed on Oct. 14, 2015.

(51) Int. Cl.
*H04L 29/06* (2006.01)
*H04L 9/14* (2006.01)
*H04L 9/32* (2006.01)
*H04L 29/08* (2006.01)

(52) U.S. Cl.
CPC ............... *H04L 63/06* (2013.01); *H04L 9/14* (2013.01); *H04L 9/32* (2013.01); *H04L 67/12* (2013.01)

(58) Field of Classification Search
CPC . H04L 63/06; H04L 67/12; H04L 9/14; H04L 9/32
See application file for complete search history.

(56) References Cited

U.S. PATENT DOCUMENTS

| 9,923,881 B2 | 3/2018 | Smith et al. |
| 2007/0043680 A1 | 2/2007 | Fox et al. |
| 2012/0303952 A1 | 11/2012 | Smith et al. |
| 2014/0006776 A1 | 1/2014 | Scott-Nash et al. |
| 2015/0092560 A1 | 4/2015 | Hui et al. |

(Continued)

OTHER PUBLICATIONS

PCT Search Report & Written Opinion received in copending PCT Application No. PCT/US2016/052974 dated Dec. 14, 2016, 13 pages.

(Continued)

*Primary Examiner* — Mohammed Waliullah
(74) *Attorney, Agent, or Firm* — Hanley, Flight & Zimmerman, LLC

(57) ABSTRACT

A method for migrating logical devices from one Internet of Things (IoT) device to another includes: receiving, by a first IoT device having a first platform group key, a request to migrate a first logical device from the first IoT device to a second IoT device having a second platform group key; removing a first logical device platform group private key associated with the first logical device from a storage of the first IoT device; sending an encrypted state of the first logical device to the second IoT device; and binding the first logical device to the second IoT device by receiving a second logical device platform group private key for the first logical device from a zone controller; and storing the second logical device platform group private key in a storage of the second IoT device.

20 Claims, 8 Drawing Sheets

(56) References Cited

U.S. PATENT DOCUMENTS

| | | |
|---|---|---|
| 2015/0201010 A1 | 7/2015 | Scarlata |
| 2016/0364787 A1 | 12/2016 | Walker et al. |
| 2016/0365975 A1 | 12/2016 | Smith |
| 2016/0366102 A1 | 12/2016 | Smith |
| 2016/0366105 A1 | 12/2016 | Smith et al. |
| 2016/0366106 A1 | 12/2016 | Smith et al. |
| 2016/0366111 A1 | 12/2016 | Smith et al. |
| 2016/0366136 A1 | 12/2016 | Heldt-Sheller et al. |
| 2016/0366141 A1 | 12/2016 | Smith et al. |
| 2016/0366157 A1 | 12/2016 | Smith et al. |
| 2016/0366180 A1 | 12/2016 | Smith et al. |
| 2016/0366181 A1 | 12/2016 | Smith et al. |
| 2016/0366188 A1 | 12/2016 | Smith et al. |
| 2017/0005820 A1* | 1/2017 | Zimmerman ........... H04L 67/10 |
| 2017/0034284 A1 | 2/2017 | Smith et al. |
| 2017/0180340 A1 | 6/2017 | Smith et al. |

OTHER PUBLICATIONS

Wikipedia, "OSI Model", https://en.wikipedia.org/wiki/OSI_model#Layer_4:_Transport_Layer, Jun. 8, 2015, 7 pages.

Wikipedia, "Key Management", https://en.wikipedia.org/wiki/Key_management, May 19, 2015, 5 pages.

Wikipedia, "Publish-Subscribe Pattern", https://en.wikipedia.org/wiki/Publish%E2%80%93subscribe_pattern, Mar. 18, 2015, 4 pages.

Wikipedia, "Data Distribution Service", https://en.wikipedia.org/wiki/Data_Distribution_Service, May 21, 2015, 5 pages.

Wikipedia, "Kerberos (Protocol)", https://en.wikipedia.org/wiki/Kerberos_%28protocol%29, May 7, 2015, 6 pages.

Stackexchange, "Cryptography", http://crypto.stackexchange.com/questions/3682/how-can-the-diffie-hellman-key-exchange-be-extended-to-three-parties, Aug. 30, 2012, 1 page.

Wikipedia, "XMPP", https://en.wikipedia.org/wiki/XMPP, May 22, 2015, 7 pages.

IBM Mobile First, "Pairwise and Group Keys", http://etutorials.org/Networking/802.11+security.+wi-fi+protected+access+and+802.11 i/Part+II+ The+Design+of+Wi-Fi+Security/Chapter+10. +WPA+and+RSN+Key+Hierarchy/Pairwise+and+Group+Keys/, accessed Sep. 3, 2015, 6 pages.

Hardjono, et al., "Fluffy: Simplified Key Exchange for Constrained Environments", draft-hardjono-ace-fluffy-00, Mar. 23, 2015, 24 pages, Intel Corporation.

openinterconnect.org, "Open Interconnect Consortium: An Overview to Connect Devices Everywhere", http://openinterconnect.org/wp-content/uploads/2015/07 /Open-Interconnect-ConsortiumOverview_Final-.pdf, Jul. 2015, 7 pages.

openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.

openinterconnect.org, "Cloud-Native Architecture and the Internet of Things", http://openinterconnect.org/wp-content/uploads/2015/07 /Cloud-Native-Io T-White-Paper_white_centered_Final.pdf, Jul. 2015, 3 pages.

openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.

U.S. Appl. No. 14/863,043, filed Sep. 23, 2015, entitled "System, Apparatus and Method for Group Key Distribution on for a Network" by Ned M. Smith.

U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.

U.S. Appl. No. 14/864,957, filed Sep. 25, 2015, entitled "System, Apparatus and Method for Managing Lifecycle of Secure Publish-Subscribe System" by Ned M. Smith, et al.

U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.

U.S. Appl. No. 14/865,191, filed Sep. 25, 2015, entitled "System, Apparatus and Method for Multi-Owner Transfer of Ownership of a Device" by Jesse Walker, et al.

U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.

U.S. Appl. No. 14/856,857, filed Sep. 17, 2015, entitled "System, Apparatus and Method for Access Control List Processing in a Constrained Environment" by Ned M. Smith, et al.

U.S. Appl. No. 14/859,572, filed Sep. 21, 2015, entitled "System, Apparatus and Method for Privacy Preserving Distributed Attestation for Devices" by Ned M. Smith, et al.

U.S. Appl. No. 14/863,496, filed Sep. 24, 2015, entitled "System, Apparatus and Method for Stateful Application of Control Data in a Device" by Nathan Heldt-Sheller, et al.

U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.

U.S. Appl. No. 15/045,676, filed Feb. 17, 2016, entitled "System, Apparatus and Method for Security Interoperability Path Analysis in an Internet of Things (IOT) Network" by Ned M. Smith, et al.

U.S. Appl. No. 62/172,962, filed Jun. 9, 2015, entitled "Providing Protected Content in an IoT Network" by Ned M. Smith, et al.

U.S. Appl. No. 14/968,125, filed Dec. 14, 2015, entitled "A Self-Configuring Key Management System for an Internet of Things Network" by Ned M. Smith.

U.S. Appl. No. 14/757,750, filed Dec. 23, 2015, entitled "System, Apparatus and Method for Optimizing Symmetric Key Cache Using Tickets Issued by a Certificate Status Check Service Provider" by Ned M. Smith, et al.

U.S. Appl. No. 14/977,742, filed Dec. 22, 2015, entitled "System, Apparatus and Method for Safety State Management of Internet Things (IoT) Devices" by Ned M. Smith, et al.

Wikipedia, "Tor", https:I/en.wikipedia.org/wiki/Tor_%28anonymity_network%29, Jun. 4, 2015, 14 pages.

Networkworld, "A guide to the confusing Internet of Things standards world", http:I/www.networkworld.com/article/2456421 /internet-of-things/a-guide-to-the-confusing-internet-of-things-standards-world. html, Jul. 21, 2014, 7 pages.

International Bureau of WIPO, "International Preliminary Report on Patentability," issued in connection with International Application No. PCT/US2016/052974, dated Apr. 26, 2018, 12 pages.

United States Patent and Trademark Office, "Non-Final Office Action," issued in connection with U.S. Appl. No. 14/976,165, dated Jul. 11, 2017, 12 pages.

United States Patent and Trademark Office, "Notice of Allowance and Fee(s) Due," issued in connection with U.S. Appl. No. 14/976,165, dated Nov. 8, 2017, 7 pages.

* cited by examiner

SYSTEM, APPARATUS AND METHOD FOR MIGRATING A DEVICE HAVING A PLATFORM GROUP

This application is a continuation of U.S. application Ser. No. 14/976,165 filed Dec. 21, 2015, which claims priority to U.S. Provisional Application No. 62/241,277 filed Oct. 14, 2015, entitled SYSTEM, APPARATUS AND METHOD FOR MIGRATING A DEVICE HAVING A PLATFORM GROUP, the contents of which are hereby incorporated in their entirety by reference.

BACKGROUND

Internet of Things (IoT) gateways and cloud services hosting virtual machines have a common objective to manage the lifecycle of logical devices that are hosted on a physical platform. Lifecycle management includes creation and deletion of the logical device instance but also may include migration of the device instance from one platform to a second platform. The security properties of logical devices are tied to the physical security capabilities of the underlying platform. Consequently, when a logical device is instantiated, the platform security properties are bound to the logical device as part of a commissioning that also instantiates device credentials. The commissioning agent asserts security properties to ascribe to the device credential based on an assessment of the hosting platform. When a logical device is migrated from a first platform to a second platform, the security properties may change, suggesting the need to re-issue the device credentials. Re-issuance of credentials is a heavy weight process that could adversely impact operational latency and availability requirements.

DETAILED DESCRIPTION

Figure 1:
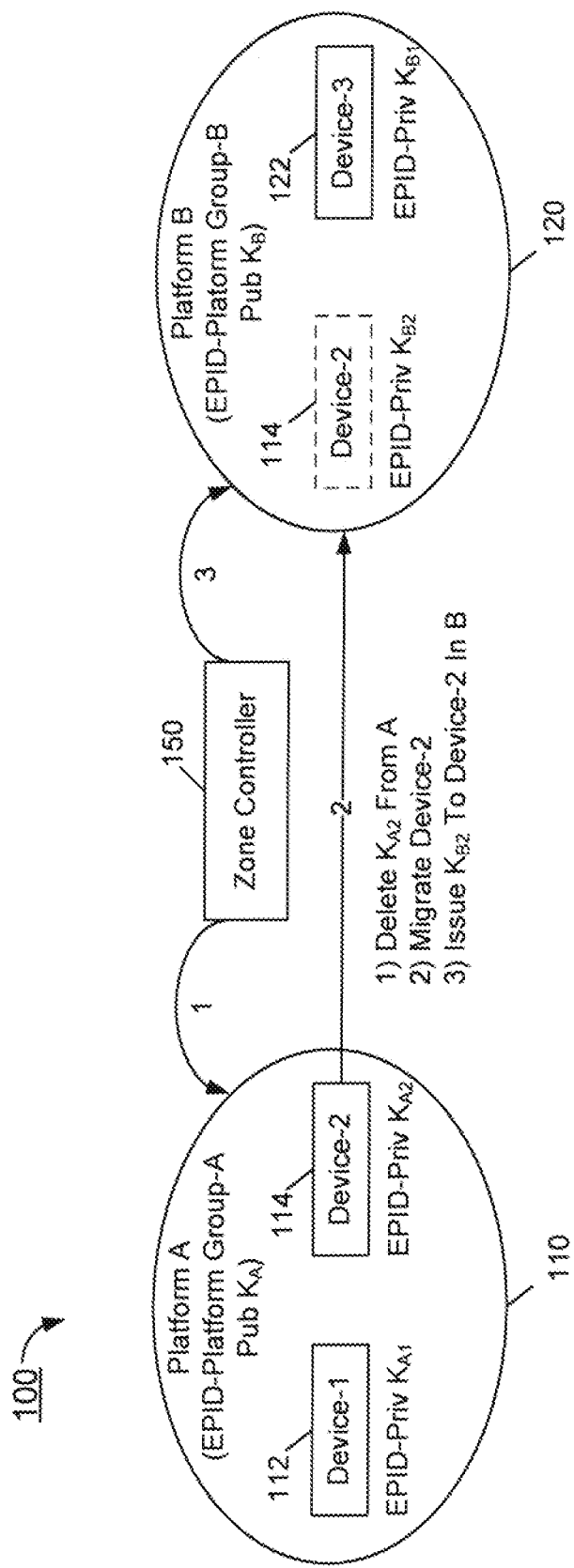
FIG. 1 is a block diagram of a system in accordance with an embodiment.

In various embodiments, techniques provide for dynamic provisioning of privacy-preserving identifier credentials (such as an Intel® Enhanced Privacy Identification (EPID)-based credential) in a platform such as an IoT device to form a platform credential that has group semantics. In this way, logical devices may join and leave the platform group without re-issuing the platform credential. As used herein, the term "logical device" includes physical components that can be dynamically inserted into and/or out of a platform, as well as logical constructs that can be dynamically added into and/or removed from a platform. As one example, a logical device can be a field replaceable unit of a larger platform (e.g., an ice maker component of a refrigerator that is an IoT platform). As another example, a logical device may be a code segment such as a downloadable application, applet, or other executable (or non-executable) code. Logical devices as such can be dynamically provisioned into and out of a platform. In turn, such logical devices may also have dynamically provisioned privacy identifier credentials that may be provisioned on instantiation of the logical device, and deleted when the logical device is migrated or otherwise removed from a platform.

When a platform is commissioned into a network, its security properties are tediously assessed and a security ranking is assigned to the platform. Examples of such security ranking may include low, medium, or high rankings, or another ranking such as a reputation profile/score based on an analysis from a reputation system. As one example, a McAfee® Global Threat Intelligence (GTI) system or McAfee® Enterprise Policy Orchestrator (EPO), may provide such scoring information. This commissioning process may involve use of a manufacturer's credential that attests to the manufacturing quality as well as the trusted execution environment (TEE) germane to the platform, e.g., including currently executing code within the TEE. In example embodiments, a TEE of the platform may leverage Intel® Secure Guard Extensions (SGX), Intel® MemCore, Intel® Converged Security Engine (CSE), Intel® virtualization technology (VT-X), Intel® IOT-OS with Smack, or ARM TrustZone, etc. The manufacturer's credential itself may be an EPID-based credential (as used herein, the term "EPID" is used generically to refer to privacy identifier credentials of different types, and further refers to other privacy preserving cryptographic techniques such as Trusted Platform Module direct anonymous attestation (DAA) identifiers, among others).

The commissioning agent issues an EPID credential (different from the manufacturer's EPID credential) that establishes a platform identity within the context of a commissioning network and captures the security ranking or label. Note that platform identity is understood to be a group of logical and physical components that are members of the platform group. Specifically, a platform may include multiple logical devices each having at least one hardware circuit such as a hardware logic and further having a device identifier. Such logical device may be addressed or otherwise recognized by other logical devices hosted on an IoT network. A certificate or ticket containing the EPID public key with these and potentially other platform attributes is issued to the platform.

When a logical device instance is created, the platform upon which it is created establishes a secure connection to a commissioning tool, where the logical device instance is joined to the platform group. The platform itself may be authorized to act as the commissioning tool for the purpose of instantiating logical devices, or an external commissioning tool may be used. The number of logical devices that may be joined to the platform group is limited only by EPID algorithm and resource limitations of the host platform.

When a logical device wishes to authenticate to another device, it uses its private EPID key to sign a challenge that proves it belongs to a given platform (e.g., platform A). The platform certificate may be used by the verifier to assess security attributes. If the device instance is contained within a TEE, an attestation of the TEE will reveal this fact. The device instance may wish to use symmetric keys to further protect device specific content. Symmetric keys may be generated and stored and bound to the device instance.

Note that a second platform (e.g., platform B) may engage in a similar commissioning exercise independent of platform A. At some point during network operation, it may be determined that one or more logical devices hosted on platform A are to be migrated to platform B. Migration involves preserving logical device state, including device specific keys and moving them to the new platform. However, the logical device is to be removed from the platform A group and joined to the platform B group.

More specifically as described herein, in a migration process, a device state of a logical device can be moved from being encrypted to a first (source) platform storage key to being encrypted to a second (destination) platform storage key. This state migration however, does not include a platform group (e.g., EPID) key of the first platform, which is left out of the device context during migration. Instead, a second platform group key is associated with the device state at the completion of the migration to the second platform, and is wrapped (bound) to the storage key of the second platform.

A commissioning protocol is used between one or more commissioning agents to accomplish the change in platform group membership. Subsequent to migration, the logical device instance may continue using its device-specific credentials. If those credentials expire and are to be refreshed, the platform B EPID credential may be used to authenticate the migrated logical device as being of the hosting platform.

Though there may be differences in a variety of platform security relevant attributes, these differences do not invalidate existing device-specific credentials. Hence, the newly migrated logical device can continue operating seamlessly except for the time it takes to move the logical device image from platform A to platform B. In addition, platform A and B credentials (such as the commissioning tool-issued dynamic EPID credentials) need not be re-issued. They retain the property of cryptographically binding the logical device instances to the platform without re-evaluation of manufacturer credentials, attestation and other context established as part of commissioning the platform into the network.

In an embodiment, platforms may provide at least one trusted storage to store multiple EPID private keys, e.g., one per logical device instance. In addition, platforms may provide a storage key that issues a private key corresponding to a platform group. The storage key hierarchy on a platform can derive a different storage key for each logical device instance hosted by the platform. This property enables each logical device instance to further protect device context from peer devices hosted on the same platform node. In embodiments, a container such as a virtual TEE may be created for each logical device instance on the same platform such that the virtual TEE aligned with each device instance has a copy of a storage root key.

Embodiments thus use dynamically provisioned EPID group keys to establish a platform identity, rather than traditional asymmetric keys, certificates, simple universally unique IDs (UUIDs) or string names. By leveraging a dynamically provisioned group key (as opposed to a statically bound platform key with a device instance key that is then used to derive platform and device identifiers) device migration can occur without re-issuing device identifiers and even platform identifiers. Embodiments enable use of EPID group management to dynamically add/remove logical device instances (e.g., IoTivity or Alljoyn IoT device instances) to a platform. Still further, embodiments enable an IoT device migration protocol that removes a device instance from a first platform and adds it to a second platform using EPID private key issuance and deletion and/or revocation.

Referring now to FIG. 1, shown is a block diagram of a system overview in accordance with an embodiment of the present invention. As illustrated, the components of a system 100 include a Platform-A (110) containing logical IoT or virtual machine instances and a Platform-B (120) also containing logical device instances. A zone controller 150, also known as a group leader, credential manager, domain controller or administrative console, is used to broker device migration. A zone (or domain) controller, such as zone controller 150, is an administrative device/gateway that performs key management functions. Zone controller 150 is the 'group leader' that assigns devices to groups. The system is constructed using EPID groups, where a group leader (aka zone controller 150) forms a group for each physical platform in the system (Platform-A and Platform-B). Platform-A is added as a member of the Platform-A group ($PG_A$); and Platform-B is added as a member of the Platform-B group ($PG_B$). It is also possible for platform A to be the group leader for logical devices (e.g., LDA) in $PG_A$. Platform-A as group leader is also a member of the group.

At some time later, logical device instances are created in the platforms. Note this creation could occur during a manufacturing process where a manufacturer determines that one or more logical device instance will be hosted by a platform being manufactured. The EPID group private values (aka gamma) may be transferred to the network's domain/zone controller. As part of the logical device creation, a commissioning protocol invokes an EPID join protocol with zone controller 150 for $PG_A$ such that logical devices D1, D2 (112 and 114, respectively) are provisioned with their own instances of $PG_A$ private keys ($K_{A1}$ and $K_{A2}$). Logical devices for $PG_B$ (namely D3, 122) follow similarly.

Assume that at a subsequent point in time, the network determines logical device D2 is to be migrated to Platform B. The migration process is generally outlined in FIG. 1. A first step (1) is to delete $K_{A2}$, thus removing it from the Platform A group. Then a migration protocol may be performed to move logical device D2 to Platform B (step 2). Next, an EPID join protocol can be performed (step 3), resulting in issuance of a new $PG_B$ private key for D2, namely $K_{B2}$. In an embodiment, the D2 image may be a combination of binary executable code, a managed runtime and one or more other management code, an interpreter and scripts, configuration/settings files, data files, symmetric and asymmetric keys or other credentials issued to or cached by D2 as well as security policies, access control policies or other data specific to D2. However note that $K_{A2}$ does not exist in the D2 image migrated to Platform B.

In an embodiment, the D2 image may be encrypted using a temporary migration encryption key derived from a migration password or encrypted by a symmetric key that is wrapped by a Rivest Shamir Adleman (RSA) (e.g.,) public key associated with Platform B. Upon arrival of the D2 image into Platform B, the image is placed in a trusted execution container/sandbox where it is permitted to execute. At least one operation available to D2 in the sandbox environment is an EPID join protocol with the group leader for $PG_B$. D2 performs the join protocol to obtain a new private EPID key $K_{B2}$. D2 may authenticate the join protocol using a migration credential established for the purpose of performing migration. This migration credential may be implemented as a migration password or an existing credential contained in its migrated image.

The domain controller may update its records to reflect the successful migration of D2 from $PG_A$ to $PG_B$. A further embodiment may be used to support inter-zone migration where a first zone controller interacts with a second zone controller to achieve a similar outcome as described above. The zone-to-zone interactions may follow key management flows defined by existing key managers such as Kerberos (Internet Engineering Task Force) (IETF) Request for Comments (RFC) 1510, Microsoft Active Directory or a key exchange protocol such as Fluffy: Simplified Key Exchange for Constrained Environments, draft-hardjono-ace-fluffy-00 (draft IETF Specification Mar. 23, 2015), where authorization for D2 to join the $PG_B$ group is facilitated by cross-realm credentials.

Referring now to FIGS. 2A-2D, shown are flow diagrams of methods in accordance with an embodiment of the present invention. In these methods, platforms are commissioned into a network, receive EPID platform group private keys, instantiate logical devices, receive logical device platform group private keys, perform a migration of at least one logical device, and thereafter attest to another platform using the dynamically provisioned EPID platform group keys.

The methods of FIGS. 2A-2D can be performed by various devices of a system, including one or more different platforms, such as IoT or other computing devices. In addition, one or more zone controllers also may perform various elements of the methods of FIGS. 2A-2D. To this end, each of these platforms and other devices can include combinations of hardware circuitry, software, and/or firmware to perform at least portions of the methods described herein.

Figure 2A:
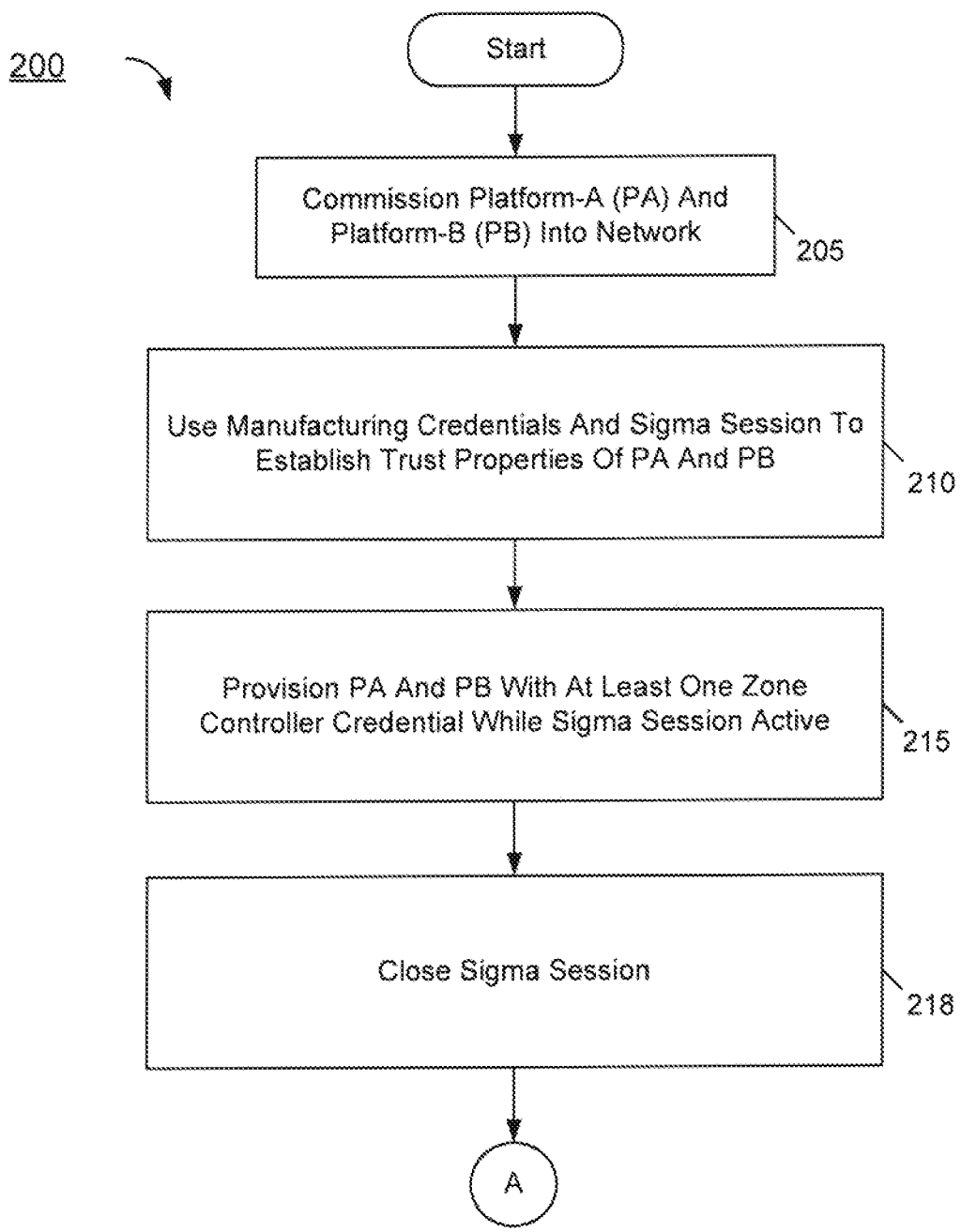
FIGS. 2A-2D are flow charts of example methods in accordance with an embodiment.

Referring now to FIG. 2A, shown is a flow diagram of a commissioning method in accordance with an embodiment. As seen, method 200 begins by commissioning multiple platforms, namely platforms PA and PB into a network (block 205). In an embodiment, the network may be an IoT network in which these platforms are provisioned. For example, the platforms may be different pieces of industrial equipment, different computing devices within an IoT network, or any other type of system having compute capabilities.

Note that a variety of device commissioning protocols and techniques may exist having varying degrees of security and reliability. Notwithstanding, the EPID algorithm may be used in a device commissioning context to authenticate and attest device properties as part of device commissioning. EPID-based attestation may occur as part of a commissioning protocol such as the Intel® Sigma and Sigma CE protocols, or subsequent to a commissioning based on a Password Authenticated Key Exchange (PAKE) protocol where an EPID signature over device attributes attests the platform. The attestation value supplied over the established PAKE or Sigma session establishes the binding between the intent to commission with the particular endpoint device that is attesting. Note that the device commissioning process use of EPID for attestation establishes the device as a member of a group (the device vendor) which is in addition, or orthogonal to, the use herein as a member of a domain or zonal group under the control of a group leader device.

Next control passes to block 210 where the platforms may use manufacturing credentials and a Sigma session to establish trust properties of the platforms. In an embodiment, these manufacturing credentials may take the form of Intel® EPID manufacturing certificates. Of course, in other embodiments different types of manufacturing credentials such as TPM elliptic curve cryptography DAA credentials or any other privacy preserving credentials may be used. Still in reference to FIG. 2A, control next passes to block 215 where the platforms may be each provisioned with at least one zone controller credential. While the scope of the present invention is not limited in this regard, in an embodiment this zone controller may use a traditional credential (e.g., X.509 certificate, Kerberos ticket, shared secret, etc.) or may use an EPID key of another group. For example, the controller may be in a group defined by a domain controller in a hierarchy of groups.

Still with reference to FIG. 2A, at block 218 the Sigma session may close, as the platforms have been provisioned into the network. Understand while shown at this high level in the embodiment of FIG. 2A, a commissioning process may include many different variations and alternatives.

Figure 2B:
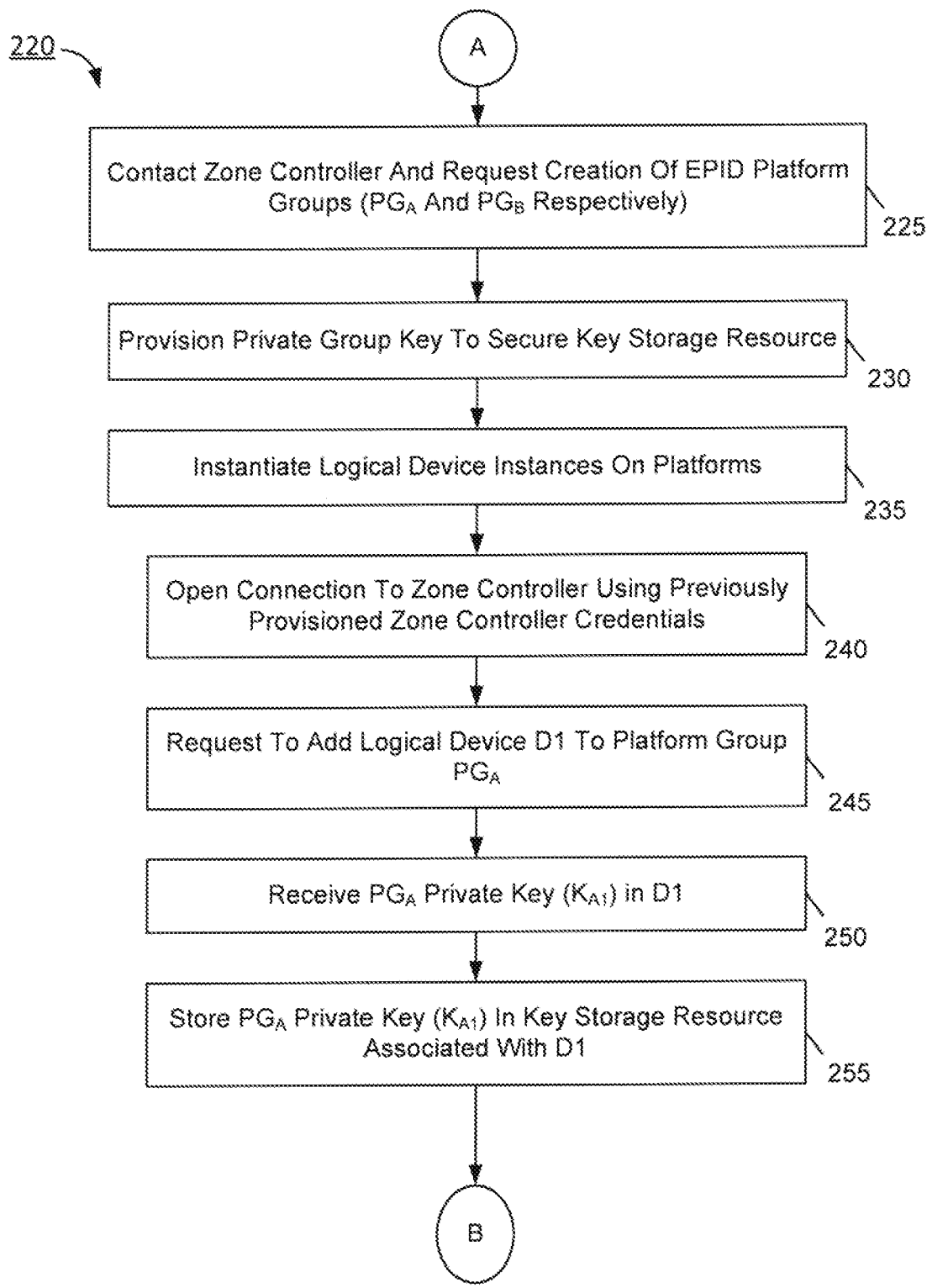

Referring now to FIG. 2B, shown is a flow diagram of a private key provisioning method in accordance with an embodiment of the present invention. As shown in FIG. 2B, method 220 may begin by contacting a zone controller (e.g., by each platform including one or more logical devices to be instantiated) to request creation of a platform group such as an EPID platform group (block 225). Next at block 230 a private group key is provisioned. In an embodiment, this private group key may be stored in a secure key storage resource of the platform. This secure key storage resource may be protected by a TEE, in an embodiment. Of course understand that a private group key may be stored elsewhere, in other embodiments. For example, an OS may expose a key store resource. Or a smart card, hardware security module (HSM), TPM, Intel® active management technology (AMT), converged security manageability engine (CSME) or other logic may wrap (encrypt) the key, and store it in a given destination, e.g., general-purpose storage such as magnetic tape, magnetic disk, optical disk, flash, DRAM or other digital storage technology, Control next passes to block 235, where one or more logical device instances can be instantiated on the platform. In an embodiment, a platform may employ a given container technology to instantiate logical devices. Although the scope of the present invention is not limited in this regard, examples of such container technologies include Intel® SGX technology, Docker, Smack, a given virtualization technology, or other process isolation environment. Control next passes to block 240 where a connection may be opened to the zone controller using the previously provisioned zone controller credentials. As such, a communication channel, e.g., a secure channel, may be established between the platform and the zone controller. Next at block 245 a given logical device (e.g., D1) may request to be added to a platform group of the platform (e.g., $PG_A$). In an embodiment, the zone controller may add this logical device to the platform group and generate a private key for the platform group for this logical device.

Next at block 250 this platform group private key (e.g., $K_{A1}$) may be received in logical device D1. In turn, logical device D1 may store this private key in a key storage resource associated with the logical device (block 255). Note that this key resource may be a single secure key storage resource of the platform. In other cases, each logical device may have a storage partition associated with it for secure storage of such private keys. Understand while shown at this high level in the embodiment of FIG. 2B, many variations and alternatives are possible.

Figure 2C:
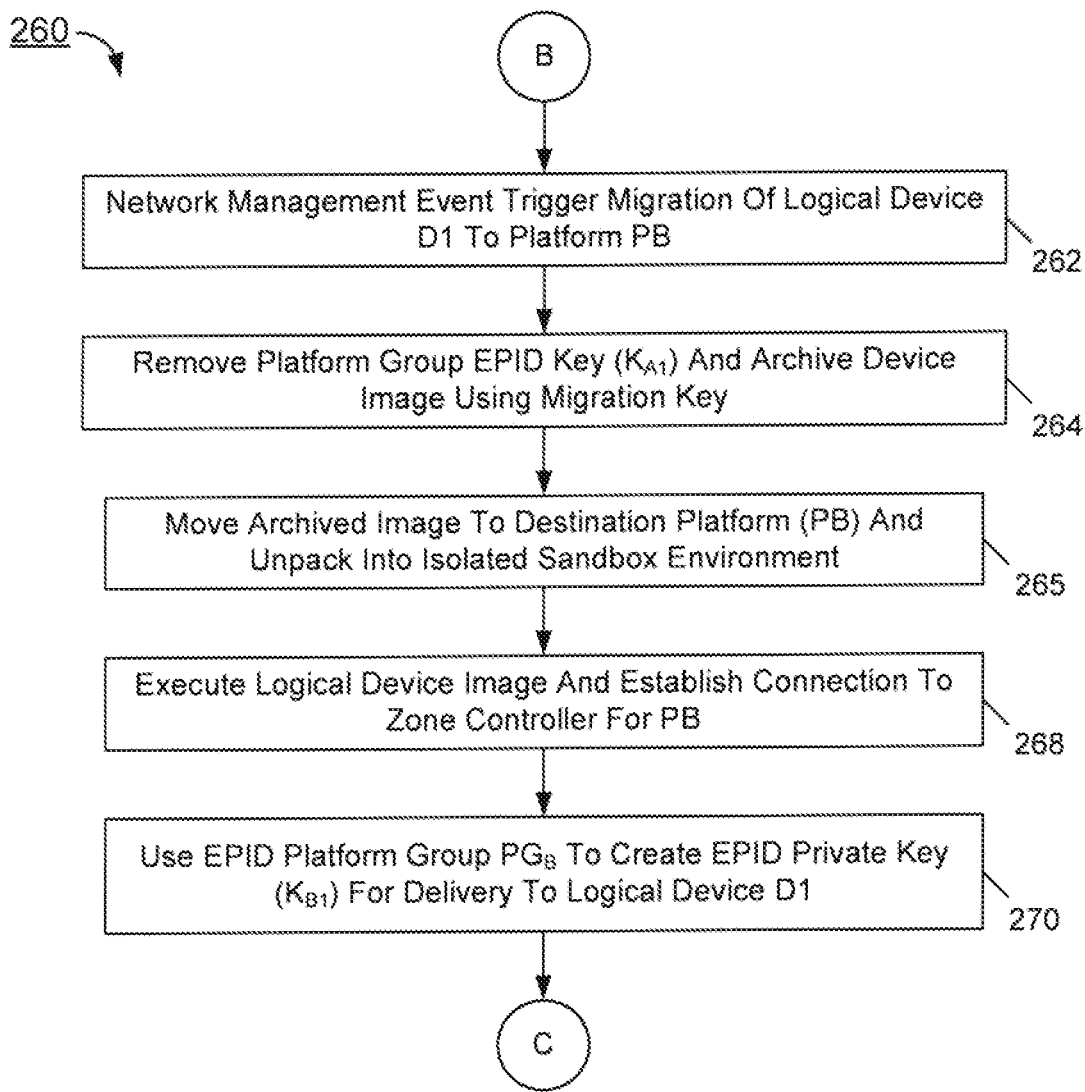

Referring now to FIG. 2C, shown is a flow diagram of a method for performing a logical device migration in accordance with an embodiment of the present invention. As shown in FIG. 2C, method 260 may begin with a network management event trigger to cause a migration of logical device D1 to another platform (e.g., platform PB) (block 262). Note that this logical device migration of logical device D1 is for ease of discussion (and does not correspond to the migration of a logical device D2 as shown and described in FIG. 1 above). At block 264, the platform group private (e.g., EPID) key ($K_{A1}$) may be removed from the secure key storage resource, and an image of the logical device (without this private key) may be archived (e.g., with encryption) using a migration key.

Control next passes to block 265, where the archived image can be moved to the destination platform. In addition, this archived image can be unpacked into an isolated environment (e.g., a sandbox environment). In different embodiments, this isolation environment may be in accordance with one of the examples described above.

Next at block 268 the logical device image is executed, e.g., within the isolation environment. In addition, a connection may be established to the zone controller for this new platform. Control next passes to block 270 where a platform group for this new platform (e.g., an EPID platform group $PG_B$) may be used to create an EPID private key ($K_{B1}$) for delivery to logical device D1 in this new platform. Understand while shown at this high level in FIG. 2C, variations and alternatives are possible.

Figure 2D:
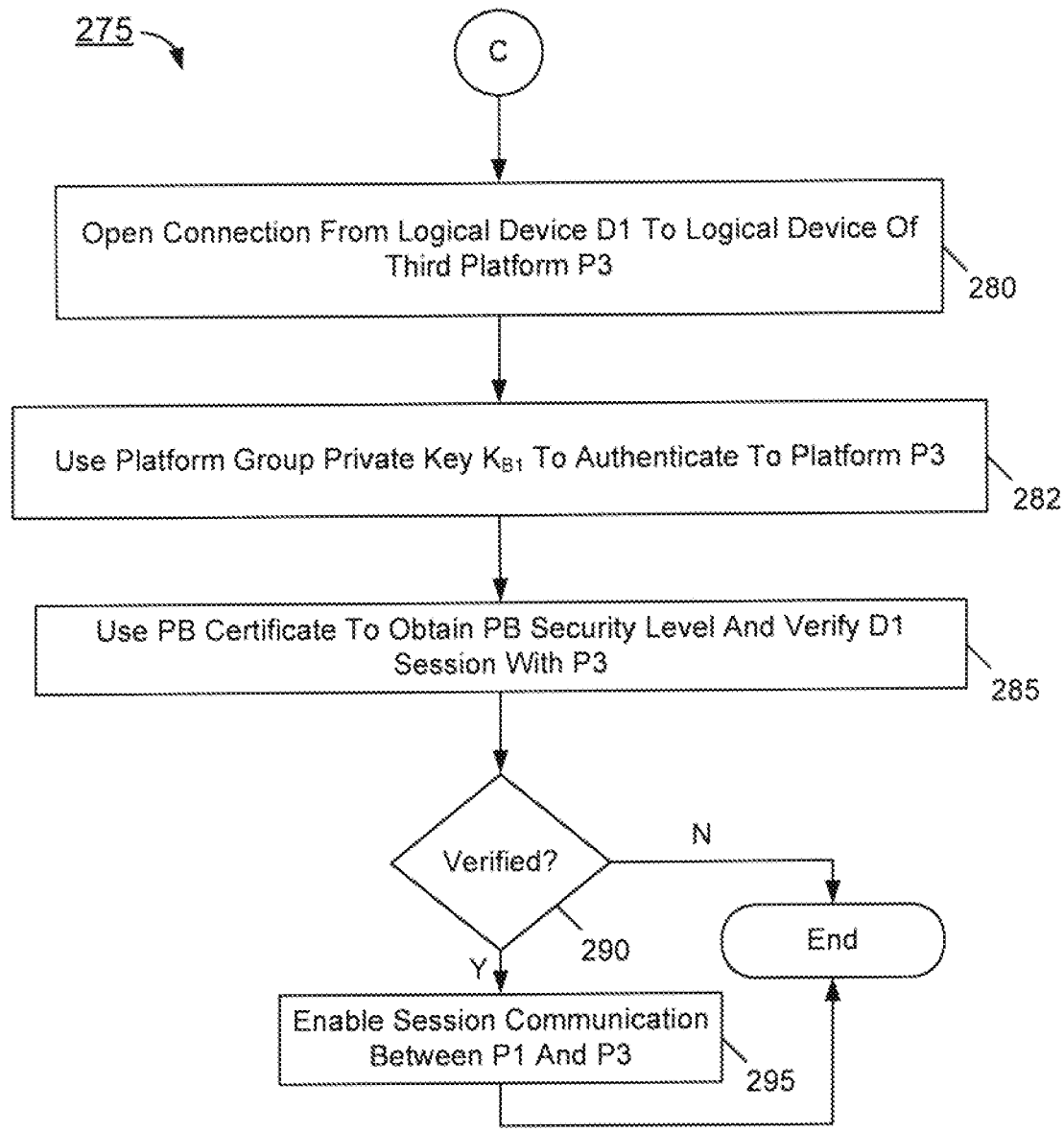

Referring now to FIG. 2D, shown is a flow diagram of an attestation method in accordance with an embodiment of the present invention. As shown in FIG. 2D, method 275 begins by opening a connection from logical device D1 to a logical device of another platform (e.g., platform P3) (block 280). Next at block 282, logical device D1 may use its platform group private key ($K_{B1}$) (in the context of logical device D1 having previously been migrated to platform B and receiving this platform group private key, e.g., according to FIG. 2C) to authenticate to platform P3. This authentication may include a response to a challenge from platform P3, signed with this platform group private key. Verifying platform P3 may use the EPID public group key for platform B (EPID-PUB B) to verify the signature. Here, assume that platform P3 has a security policy that requires logical devices to be hosted on a platform meeting at least a predetermined minimum security level. To this end, use of the platform private group key $K_{B1}$ by logical device D1 allows the credential for platform PB (issued at platform commissioning) to represent the platform security level to this verifying platform P3.

Next at block 285 a certificate for PB may be used to obtain the security level of platform PB and verify the session with logical device D1. For example, the certificate may provide information regarding security parameters of the platform, including presence of one or more trusted execution environments, and proof of the isolation enabled by such environments.

Next at diamond 290 it is determined whether logical device D1 is verified, e.g., as a member of platform group PB and that it is executing in a protected environment. If so, control passes to block 295 where communication within a thus established secure session may occur between logical device D1 and platform P3 within the established session. Understand that if verification should fail, this session is not established. While FIGS. 2A-2D show representative operations between different platforms and logical devices, the scope of the present invention is not limited in this regards, and other interactions may occur between platforms and devices in other manners.

One embodiment of an EPID join protocol may be according to the following:
1. The issuer chooses an Intel® EPID group for the member. Let gid be the chosen group ID. Let (gid, h1, h2, w) be the group public key and (gid, gamma) be the group issuing private key.
2. Let NI be a 256-bit nonce chosen by the issuer.
3. The member chooses a random integer f between [1, p−1] or derives f between [1, p−1] from some seed value.
4. The member runs a JoinP process to create a join request (F, c, s).
5. The member sends the join request (F, c, s) to the issuer.
6. The issuer runs the JoinI process to create a membership credential (gid, A, x) for member.
7. The issuer sends the membership credential (gid, A, x) to the member.
8. The member concatenates the membership credential (gid, A, x) received and the f value generated in step 3 into an Intel® EPID private key (gid, A, x, f). The member can validate the private key.

Thus in various embodiments, an EPID may be used to form platform groups suitable for hosting logical IoT devices on a physical platform. In turn, EPID platform groups may be used to allow a logical IoT device to authenticate to other IoT devices using an EPID group credential. EPID platform groups may be used to migrate a logical IoT device instance to a second platform. EPID platform groups may be leveraged to hide platform specific implementation details that are evaluated once at platform commissioning into a network, while allowing logical device migrations to occur dynamically within the network. Note that this dynamically provisioned EPID can be used as a platform credential that IoT devices may use to authenticate to other devices without re-issuing the platform credentials in the context of device migration, but where there is a strong cryptographic binding between the IoT device instance and the physical platform.

Figure 3:
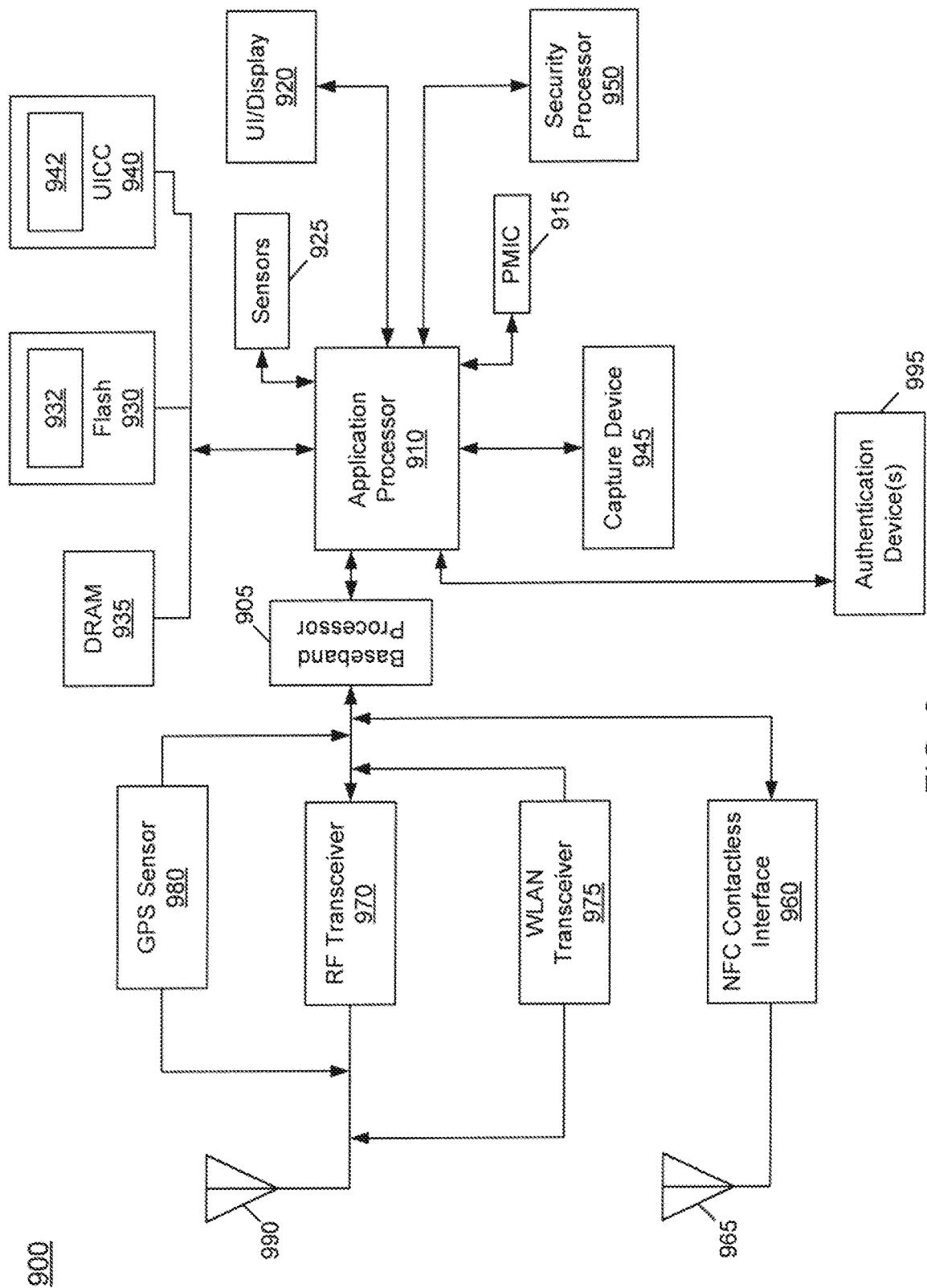
FIG. 3 is a block diagram of an example system with which embodiments can be used.

Referring now to FIG. 3, shown is a block diagram of an example system with which embodiments can be used. As seen, system 900 may be a smartphone or other wireless communicator or any other IoT device such as an IoT network-connected appliance or industrial device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 3, a universal integrated circuit card (UICC) 940 comprises a subscriber identity module, which in some embodiments includes a secure storage 942 to store secure user information. System 900 may further include a security processor 950 that may implement a TEE as described earlier, and which may couple to application processor 910. Furthermore, application processor 910 may implement a secure mode of operation, such as Intel® Software Guard Extensions (SGX) to a given instruction set architecture and circuitry for hosting of a TEE, as described earlier. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 3, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 4:
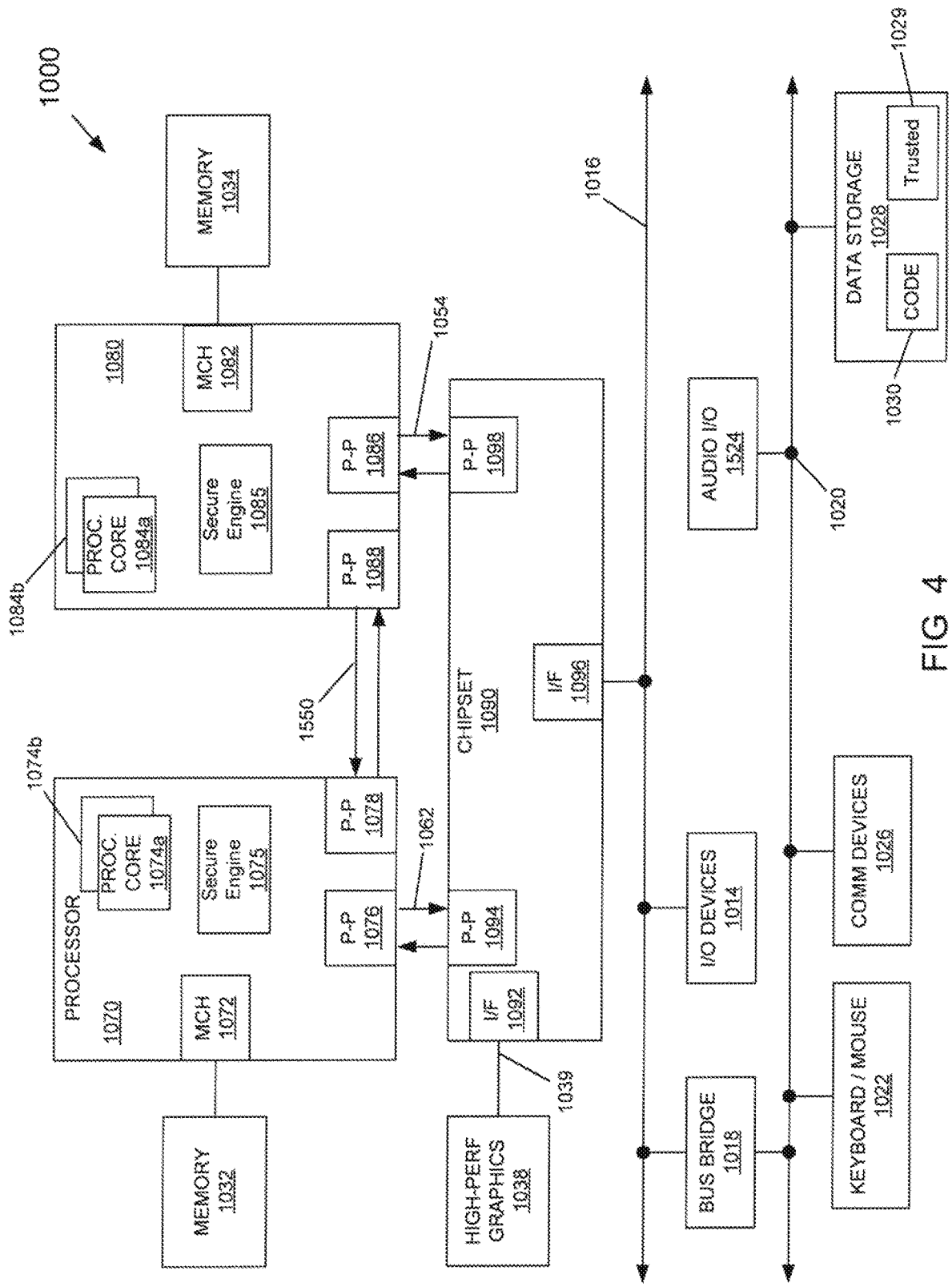
FIG. 4 is a block diagram of a system in accordance with another embodiment of the present invention.

Referring now to FIG. 4, shown is a block diagram of a system in accordance with another embodiment of the present invention. As shown in FIG. 4, multiprocessor system 1000 is a point-to-point interconnect system such as a server system, and includes a first processor 1070 and a second processor 1080 coupled via a point-to-point interconnect 1050. As shown in FIG. 4, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations and instantiations of EPID-based platform group keys for a platform and included logical devices, and secure migration of logical devices as described herein.

Still referring to FIG. 4, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 4, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 4, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 4, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 5:
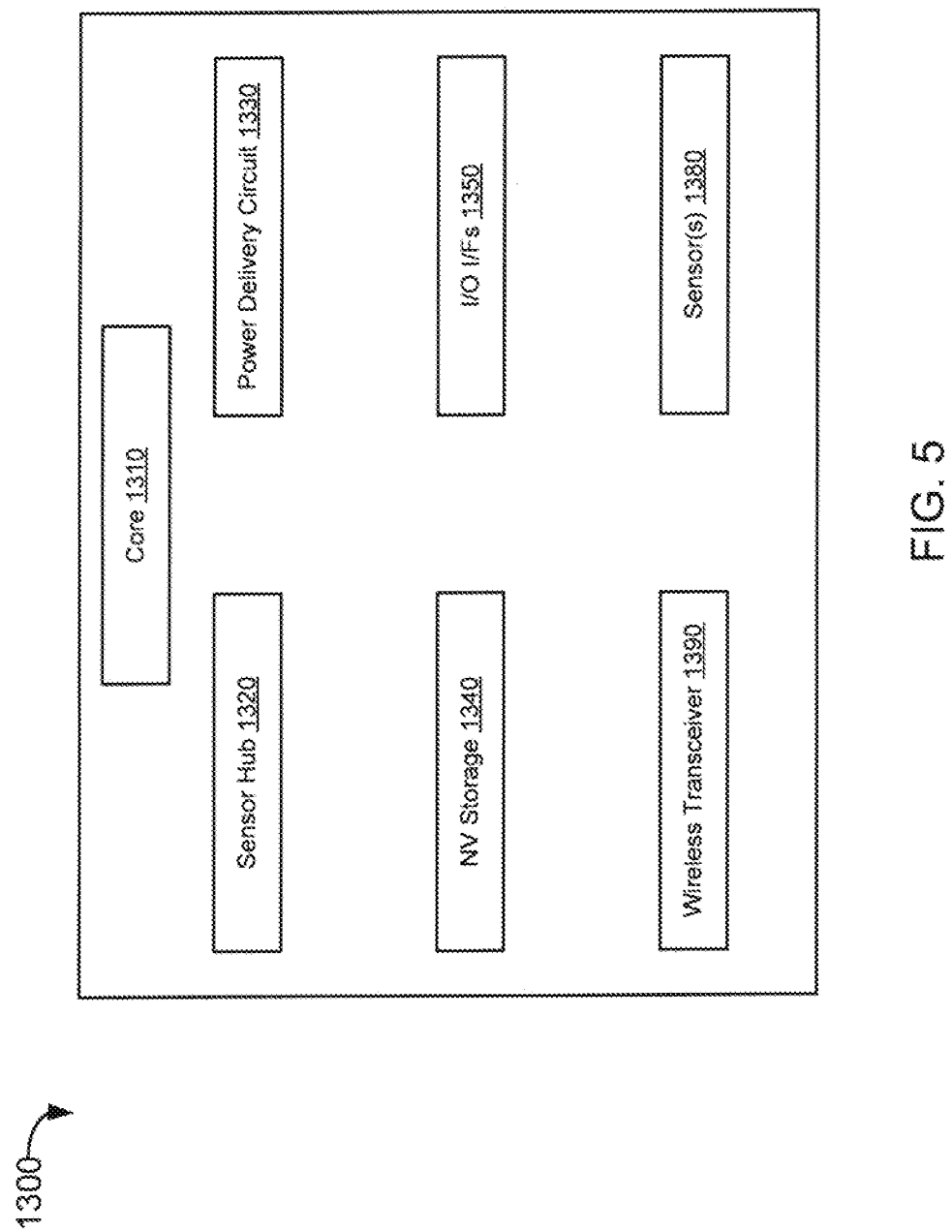
FIG. 5 is a block diagram of a wearable module in accordance with another embodiment.

Embodiments may be used in environments where IoT devices may include wearable devices or other small form factor IoT devices. Referring now to FIG. 5, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (TO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms.

The following Examples pertain to further embodiments.

In Example 1, a method comprises: receiving, in a first logic of a first IoT device from a zone controller of a network, a dynamically provisioned first platform group key for the first IoT device; storing the first platform group key in a first storage of the first IoT device; instantiating a first logical device in the first IoT device; receiving a dynamically provisioned first logical device platform group private key for the first logical device from the zone controller; and storing the first logical device platform group private key in a second storage of the first IoT device, to bind the first logical device to the first IoT device.

In Example 2, the method further comprises receiving a request to migrate the first logical device from the first IoT device to a second IoT device having a dynamically provisioned second platform group key.

In Example 3, the method further comprises, responsive to the request: removing the first logical device platform group private key from the second storage; encrypting a state of the first logical device; and sending the encrypted state of the first logical device to the second IoT device.

In Example 4, the first platform group key is to remain in the first storage of the first IoT device after the first logical device migration.

In Example 5, the method further comprises authenticating to a second IoT device using the first platform group key.

In Example 6, the method further comprises using the first logical device platform group private key to sign a challenge from the second IoT device, to verify that the first logical device is of the first IoT device.

In Example 7, the method of one or more of the above Examples further comprises: receiving an encrypted image of a second logical device from a second IoT device; isolating the encrypted image and establish a connection to the zone controller to cause the zone controller to generate a second logical device platform group private key for the second logical device; and receiving and storing the second logical device platform group private key in the second storage of the IoT device.

In Example 8, the method further comprises using the second logical device platform group private key and the first platform group key to authenticate the second logical device to a third IoT device.

In another Example, a computer readable medium including instructions is to perform the method of any of the above Examples.

In another Example, a computer readable medium including data is to be used by at least one machine to fabricate at least one integrated circuit to perform the method of any one of the above Examples.

In another Example, an apparatus comprises means for performing the method of any one of the above Examples.

In Example 9, an apparatus comprises: a processor to execute instructions and having at least a first hardware logic to execute in a trusted execution environment; a secure storage to store a platform group credential, the platform group credential dynamically provisioned into the apparatus and corresponding to an enhanced privacy identifier associated with the apparatus; and a first logical device comprising at least one hardware logic, the first logical device having a first platform group private key, the first platform group private key dynamically provisioned into the first logical device and corresponding to an enhanced privacy identifier associated with the first logical device.

In Example 10, the first platform group private key is to be stored in a second secure storage associated with the first logical device.

In Example 11, the first logical device is dynamically migratable to a second apparatus to couple to the apparatus.

In Example 12, the apparatus is to encrypt a state of the first logical device prior to migration of the first logical device to the second apparatus, the encrypted state of the first logical device not having the first platform group private key.

In Example 13, the platform group credential and the first platform group private key are different than a manufacturer enhanced privacy identifier associated with the apparatus by a manufacturer of the apparatus.

In Example 14, an apparatus comprises: means for receiving, from a zone controller of a network, a dynamically provisioned first platform group key for a first IoT device and storing the first platform group key in a first storage; means for instantiating a first logical device in the first IoT device; and means for receiving a dynamically provisioned first logical device platform group private key for the first logical device from the zone controller and storing the first logical device platform group private key in a second storage, to bind the first logical device to the first IoT device.

In Example 15, the apparatus further comprises means for receiving a request to migrate the first logical device from the first IoT device to a second IoT device, where the second IoT device has a dynamically provisioned second platform group key.

In Example 16, the apparatus of Example 15 further comprises: means for removing the first logical device platform group private key from the second storage; means for encrypting a state of the first logical device; and means for sending the encrypted state of the first logical device to the second IoT device.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for migrating logical devices from one Internet of Things (IoT) device to another, comprising:
   detecting, by executing an instruction with a first IoT device, a request to migrate a first logical device from the first IoT device to a second IoT device, the first IoT device including a first platform group key, the second IoT device including a second platform group key;
   removing, by executing an instruction with the first IoT device, a first logical device platform group private key associated with the first logical device from a storage of the first IoT device;
   migrating, by executing an instruction with the first IoT device, the first logical device platform group private key of the first logical device to the second IoT device; and
   binding, by executing an instruction with the first IoT device, the first logical device to the second IoT device, by:

receiving a second logical device platform group private key for the first logical device from a zone controller; and storing the second logical device platform group private key in a storage of the second IoT device, the second logical device platform group private key is based on the second platform group key.

2. The method of claim 1, further including:

authenticating the first logical device to a third IoT device including a third platform group key, by:

verifying the first logical device is a logical device of the second IoT device by using the second logical device platform group private key to sign a challenge from the third IoT device;

obtaining a security level associated with the second IoT device by verifying a session with the first logical device using the second platform group key; and establishing a secure session between the first logical device and a logical device instantiated in the third IoT device, responsive to the authentication and the security level.

3. The method of claim 2, wherein respective ones of the first, second and third platform group keys are associated with a corresponding enhanced privacy-preserving identifier credential including group semantics.

4. The method of claim 2, wherein respective ones of the first, second and third platform group keys correspond to a respective Enhanced Privacy Identification (EPID) key.

5. The method of claim 1, further including, prior to receiving the request to migrate the first logical device:

receiving, by the first IoT device from the zone controller, the first platform group key for the first IoT device;

storing the first platform group key in the storage of the first IoT device;

instantiating the first logical device in the first IoT device;

receiving the first logical device platform group private key associated with the first logical device from the zone controller; and storing the first logical device platform group private key in the storage of the first IoT device to bind the first logical device to the first IoT device, wherein the first platform group key and the first logical device platform group private key are dynamically provisioned.

6. The method of claim 5, wherein the first platform group key remains in the storage of the first IoT device after the first logical device migration.

7. The method of claim 1, further including:

receiving, in the first IoT device, an encrypted image of a second logical device from the second IoT device;

isolating the encrypted image;

establishing a connection to the zone controller to cause the zone controller to generate a third logical device platform group private key for the second logical device; and storing the third logical device platform group private key in the storage of the first IoT device.

8. A computer readable storage device or storage disk comprising instructions to migrate logical devices from one Internet of Things (IoT) device to another, the instructions, when executed by one or more processors, cause the one or more processors to at least:

detect, by a first IoT device including a first platform group key, a request to migrate a first logical device from the first IoT device to a second IoT device including a second platform group key;

remove a first logical device platform group private key associated with the first logical device from a storage of the first IoT device;

migrate the first logical device platform group private key of the first logical device to the second IoT device;

receive, by the second IoT device, a second logical device platform group private key for the first logical device from a zone controller; and store the second logical device platform group private key in a storage of the second IoT device, to bind the first logical device to the second IoT device, the second logical device platform group private key is based on the second platform group key.

9. The computer readable storage device or storage disk of claim 8, wherein the instructions, when executed, cause the one or more processors to:

authenticate the first logical device to a third IoT device including a third platform group key;

verify the first logical device is a logical device of the second IoT device by using the second logical device platform group private key to sign a challenge from the third IoT device;

obtain a security level associated with the second IoT device by verifying a session with the first logical device using the second platform group key; and establish a secure session between the first logical device and a logical device instantiated in the third IoT device, responsive to the authentication and the security level.

10. The computer readable storage device or storage disk of claim 9, wherein respective ones of the first, second and third platform group keys are associated with a corresponding enhanced privacy-preserving identifier credential including group semantics.

11. The computer readable storage device or storage disk of claim 9, wherein respective ones of the first, second and third platform group keys correspond to a respective Enhanced Privacy Identification (EPID) key.

12. The computer readable storage device or storage disk of claim 8, wherein the instructions, when executed prior to receiving the request to migrate the first logical device, cause the one or more processors to:

receive, by the first IoT device from the zone controller, the first platform group key for the first IoT device;

store the first platform group key in the storage of the first IoT device;

instantiate the first logical device in the first IoT device;

receive the first logical device platform group private key associated with the first logical device from the zone controller; and store the first logical device platform group private key in the storage of the first IoT device to bind the first logical device to the first IoT device, the first platform group key and the first logical device platform group private key are dynamically provisioned.

13. The computer readable storage device or storage disk of claim 12, wherein the instructions, when executed, cause the first platform group key to remain in the storage of the first IoT device after the first logical device migration.

14. The computer readable storage device or storage disk of claim 8, wherein the instructions, when executed, cause the one or more processors to:

receive, in the first IoT device, an encrypted image of a second logical device from the second IoT device;

isolate the encrypted image and establish a connection to the zone controller to cause the zone controller to generate a third logical device platform group private key for the second logical device; and receive and store the third logical device platform group private key in the storage of the first IoT device.

15. An apparatus comprising:

memory including computer-executable instructions;

a first logical device including a first logical device platform group private key;

secure storage to store a first platform group key of the apparatus and the first logical device platform group private key; and a processor to execute the instructions in a trusted execution environment to:

detect a request to migrate the first logical device from the apparatus to a second apparatus including a second platform group key;

in response to the request, remove the first logical device platform group private key associated with the first logical device from the secure storage; and migrate the first logical device platform group private key of the first logical device to the second apparatus, wherein the first logical device is bound to the second apparatus by the second apparatus receiving a second logical device platform group private key for the first logical device from a zone controller, and the second apparatus storing the second logical device platform group private key in a storage of the second apparatus, the second logical device platform group private key is based on the second platform group key.

16. The apparatus of claim 15, wherein respective ones of the first and second platform group keys are associated with a corresponding enhanced privacy-preserving identifier credential including group semantics.

17. The apparatus of claim 15, wherein respective ones of the first and second platform group keys correspond to a respective Enhanced Privacy Identification (EPID) key.

18. The apparatus of claim 15, wherein the processor is to:

receive the first platform group key of the apparatus from the zone controller;

store the first platform group key in the secure storage;

instantiate the first logical device in the apparatus;

receive the first logical device platform group private key associated with the first logical device from the zone controller; and store the first logical device platform group private key in the secure storage to bind the first logical device to the apparatus, the first platform group key and the first logical device platform group private key are dynamically provisioned.

19. The apparatus of claim 18, wherein the processor is to keep the first platform group key in the secure storage after the first logical device migration.

20. The apparatus of claim 15, wherein the processor is to:

receive an encrypted image of a second logical device from the second apparatus;

isolate the encrypted image and establish a connection to the zone controller to cause the zone controller to generate a third logical device platform group private key for the second logical device; and receive and store the third logical device platform group private key in the secure storage.

* * * * *